United States Patent [19]
Satorius

[11] 3,909,812
[45] Sept. 30, 1975

[54] FLASHING INDICATOR APPARATUS

[75] Inventor: Walter Satorius, Minooka, Ill.

[73] Assignee: Jemco Engineering Co., Minooka, Ill.

[22] Filed: Aug. 28, 1974

[21] Appl. No.: 501,239

[52] U.S. Cl.......... 340/227 R; 340/331; 340/244 R; 331/111; 315/200 A; 250/577
[51] Int. Cl.².................... H05B 3/68; G08B 21/00
[58] Field of Search............ 340/227 R, 228 R, 331, 340/213 R, 244 R; 315/200 A; 331/111; 328/3; 250/577

[56] References Cited
UNITED STATES PATENTS

| | | | |
|---|---|---|---|
| 3,683,347 | 8/1972 | Melone | 340/331 X |
| 3,845,349 | 10/1974 | Liebman | 315/200 A |
| 3,852,728 | 12/1974 | Flagg, Jr. | 340/227 R |

Primary Examiner—John W. Caldwell
Assistant Examiner—William M. Wannisky
Attorney, Agent, or Firm—Molinare, Allegretti, Newitt & Witcoff

[57] ABSTRACT

A flashing indicator. The indicator includes an indicator light, a second light having a predetermined firing potential, a mechanism for periodically firing the second light, and a transistor. Firing of the second light causes the transistor to conduct and electrically short the indicator light. The periodic nature of the firing results in a flashing indicator light.

11 Claims, 3 Drawing Figures

U.S. Patent    Sept. 30,1975    3,909,812
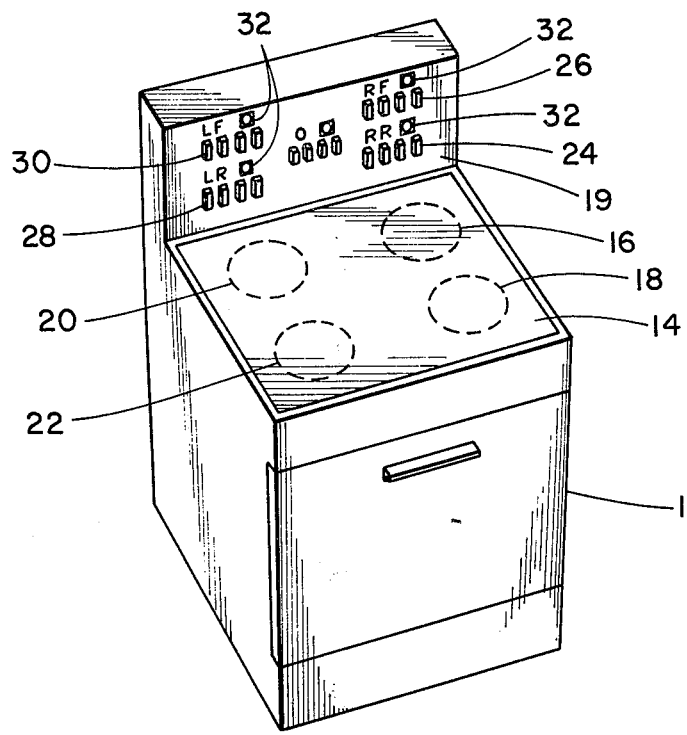
FIG.1
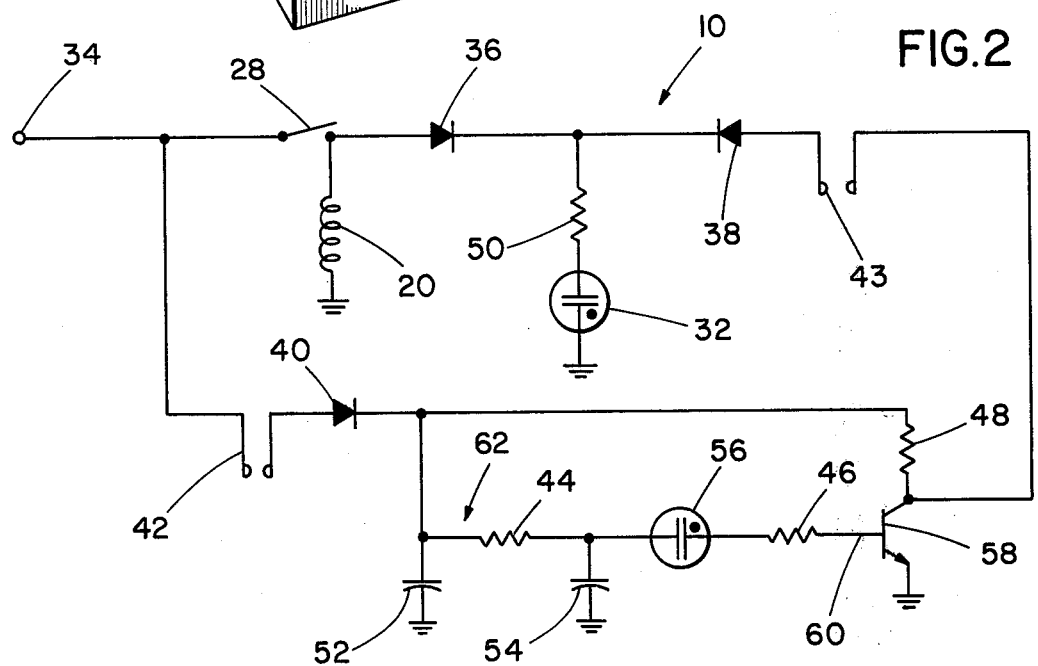
FIG.2
FIG.3
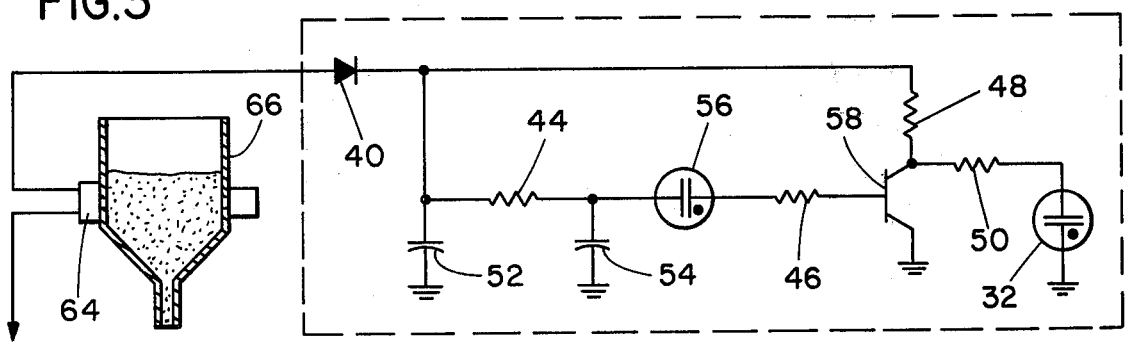

FLASHING INDICATOR APPARATUS

BACKGROUND OF THE INVENTION

The present invention relates generally to a flashing indicator apparatus and more particularly to a flashing light temperature indicator for a ceramic top infrared range.

The presently available ceramic top ranges generally include four radiant burners situated under a ceramic cover. As such, the burners themselves are invisible to an operator of the range.

A series of lights on the control panel of the range indicate the operative burners, if any. In addition, a portion of the ceramic top adjacent an operative burner glows above a temperature of approximately 300°–350° F., further indicating usage.

Unfortunately, the presently known ceramic top ranges suffer from a serious and dangerous drawback. The ranges do not include any warning mechanism whatsoever for indicating an inoperative, yet still "hot" burner element. That is, the control panel fails to disclose whether a previously used burner has cooled to a safe temperature. Thus, the operator may, without any warning of the dangerous condition (assuming the ceramic top is no longer glowing), attempt to use or clean the range and thereby incur a severe injury from the insufficiently cooled burner.

SUMMARY OF THE INVENTION

In a principle aspect, the present invention is a flashing indicator apparatus for indicating a predetermined condition. The indicator apparatus includes an indicator light, a second light having a predetermined firing potential, a mechanism for intermittently firing the second light, a transistor, and a mechanism for sensing the predetermined condition.

Whenever the predetermined condition exists, the indicator light is connected through the sensing mechanism to a power supply. The transistor, in response to the firing of the second light, electrically shorts the indicator light. Thus, the indicator light intermittently flashes.

It is thus an object of the present invention to provide a flashing indicator apparatus for sensing and indicating a predetermined condition.

It is a further object of the present invention to provide a flashing light indicator which is readily and inexpensively manufactured.

It is also an object of the present invention to provide a flashing indicator apparatus comprising a minimal number of parts.

It is another object of the present invention to provide a flashing light indicator apparatus for sensing and indicating the temperature of a burner element of a ceramic top range.

It is a further object of the present invention to provide a flashing indicator for indicating whenever the temperature of a ceramic top range burner element exceeds a safe, predetermined temperature.

These and other objects, advantages and features of the present invention will become apparent in the following detailed description.

BRIEF DESCRIPTION OF THE DRAWING

A preferred embodiment of the present invention will be described, in detail, with reference to the drawing wherein:

FIG. 1 is a perspective view of a ceramic top infrared radiant range incorporating a preferred embodiment of the present invention;

FIG. 2 is a schematic diagram illustrating a preferred embodiment of the present invention for use in the range shown in FIG. 1; and FIG. 3 is a schematic diagram illustrating an alternative use of the preferred embodiment shown in FIG. 2.

DETAILED DESCRIPTION OF THE PRESENT INVENTION

A preferred embodiment of the present invention is shown schematically in FIG. 2 and generally designated as a flashing indicator apparatus 10. The indicator apparatus 10 is incorporated into a ceramic top infrared radiant range 12, shown in FIG. 1.

The range 12 includes a ceramic top 14 and a series of burners 16, 18, 20, 22, shown in phantom. The range 12 also includes a control panel 19.

The operation of the burner elements 16, 18, 20, 22 is controlled by a series of push bottons 24, 26, 28, 30, respectively. The individual buttons within the series represent different heat settings. Thus, the burner elements 16, 18, 20, 22 have several functional or energized operating states, as well as a de-energized, or "off", state.

In the vicinity of each button series 24, 26, 28, 30, there is an indicator light, in each case designated 32, for indicating the operational state of the respective burners 16, 18, 20, 22. In the presently available ceramic top ranges 12, the indicator light 32 is only operational when burner element is energized. That is, the indicator light 32 only indicates whether a burner is "on" or off.

For purposes of clarity, the indicator apparatus 10, shown in FIG. 2, illustrates the circuitry for a single burner element, i.e., burner element 20. The circuitry is, however, readily modified to include the burner elements 16, 18, 22. In addition, the series of push buttons 28 is shown schematically as a single switch.

The flashing indicator apparatus 10 includes a power supply, generally designated 34, diodes 36, 38, 40, thermostatic switches 42, 43, resistors 44, 46, 48, 50, capacitors 52, 54, a second light 56, and a transistor 58, connected as shown. In this preferred embodiment, the power supply 34 is a standard household A-C supply. Thus, the flashing indicator apparatus 10 and range 12 are powered by the same supply 34. The indicator apparatus 10 may, however, be electrically powered by an independent source, e.g., a battery.

The lights 32, 56 are preferably neon gas, high brightness bulbs. The bulbs 32, 56 have a predetermined threshold firing potential. That is, the voltage across the bulb must equal or slightly exceed the firing potential before the bulb will conduct. After firing, the bulb will remain operative until the potential drops below a second, lower threshold voltage.

Preferably, the firing potential of the second light 56 is 75 volts. Thus, when the capacitor 54 charges to approximately 75 volts, the light 56 will fire, conduct current and glow.

The thermostatic switches 42, 43 thermodynamically communicate with the burner element 20. The switches 42, 43 close as the ambient temperature around the burner 20 rises above a predetermined temperature threshold. In order to avoid injury to an operator of the range 12, Applicant has determined that a closing temperature of approximately 120° F. is desirable.

Theoretically, the thermostatic switches 42, 43 open as the ambient temperature drops below the threshold. In practice, the switches 42, 43 open only after a somewhat lower temperature is achieved, e.g., 90°F.

In operation, the operator of the range 12 selects the appropriate push button 28 to energize the burner element 20. Referring to FIG. 2, the closing of switch 28 connects the indicator light 32 to the power supply 34 through diode 36 and resistor 50. The diode 36 rectifies the ordinary AC household current to substantially avoid the application of a negative potential across the indicator bulb 32. As the burner element 20 is heated, the thermostatic switches 42, 43, activate. That is, as the temperature of the burner element 20 substantially equals the closing threshold temperature of the thermostatic switches 42, 43, the contacts of each switch 42, 43 will close. Upon closing, the second light 56-transistor 58 combination is interconnected with the power supply 34.

The closing of the thermostatic switches 42, 43 also interconnects the indicator light 32 and power supply 34 through diodes 38, 40 and resistors 48, 50. The indicator light 32 is, therefore, operative for a period of time after de-energization of the burner element 20. More specifically, the indicator 32 will remain operative until the thermostatic switches 42, 43 open.

The diode 40 rectifies the voltage from the power supply 34. The diode 38 is a safety device, or reverse current prohibitor, to substantially avoid a flow of current into the transistor 58 during energized operation of the burner element 20.

The capacitor 52 filters the input voltage to the R-C circuit of resistor 44 and capacitor 54. As discussed above, the second neon gas bulb 56 appears as an open circuit until a substantial potential is developed.

As the capacitor 54 charges and the capacitor voltage substantially equals the firing potential, the light 56 fires and conducts. As a result, a small positive potential develops at the base 60 of the transistor 58 and the transistor 58 turns on.

Now conducting, the transistor 58 electrically shorts the indicator light 32. That is, all current in the resistor 48 flows through the transistor 58 to ground.

This condition is maintained until the capacitor 54 sufficiently discharges and the neon bulb 56 becomes inoperative. At that point, the transistor 58 turns off and current again flows to the indicator light 32.

The capacitor 54 then re-charges such that the second light 56 repetitively fires. As a result, the indicator light 32 flashes until the thermostatic switches 42, 43 open. In other words, the indicator light 32 flashes until the temperature of the inoperative burner element 20 drops to a sufficiently low, safe temperature. This flashing warns the operator of the heated condition of the portion of ceramic top 14 adjacent the burner 20. It should be noted that the power supply 34, resistor 44 and capacitor 54 cooperatively define means, generally designated 62, for intermittently firing the second light 56.

It should also be noted that thermostatic switch 42 substantially avoids firing of the second light 56 during periods of non-use. The capacitor 54 only charges after a burner element has been used and sufficiently heated. On the other hand, the switch 43 effectively directs current from the power supply 34 to the proper indicator light 32. For example, if burner element 20 had not been operative, the switch 43, shown in FIG. 2, would not be closed.

Referring now to FIG. 3, an alternate use of the flashing indicator apparatus 10 is shown. Elements similar to those shown in FIG. 2 are similarly identified.

In this preferred embodiment, the flashing indicator apparatus 10 operates in conjunction with a light source - photocell combination, generally designated 64, to monitor the state of fullness of a hopper 66. The indicator light 32 remains inoperative until the photocell - light source combination 62 electrically interconnects the power supply 34 and flashing indicator apparatus 10.

In a similar fashion to that described above, a hopper level below a predetermined level operates the indicator light 32 and begins charging of the capacitor 54. The subsequent and repetitive firing of the light 56 causes the transistor 58 to short the indicator light 32, thereby producing the flashing action.

Two preferred embodiments of the present invention have been described. It should be understood, however, that various changes and modifications can be made to the preferred embodiments shown without departing from the true spirit and scope of the present invention, as set forth in the following claims.

What is claimed is:

1. A flashing indicator apparatus for indicating a predetermined condition comprising, in combination:
    a power supply;
    indicator light means visible to an operator;
    second light means having a predetermined firing potential, said second light means being operable in a first state whenever the voltage across said second light means exceeds said predetermined firing potential;
    means for sensing said predetermined condition and connecting said indicator light means to said power supply whenever said predetermined condition exists; and
    transistor means having an operable state for electrically shorting said indicator light means, said transistor means being interconnected with and responsive to said light means, said transistor means being in said operable state whenever said second light means is in said first state, whereby said indicator light means intermittently flashes.

2. A flashing indicator apparatus as claimed in claim 1 wherein said firing means includes a capacitor in parallel combination with said second light means, said capacitor having a capacitor voltage, said second light means firing whenever said capacitor voltage substantially equals said firing potential.

3. A flashing indicator apparatus as claimed in claim 2 wherein said sensing means connects said capacitor to said power supply whenever said predetermined condition exists to charge said capacitor.

4. A flashing indicator apparatus as claimed in claim 1 wherein said second light means includes a neon gas bulb.

5. A flashing indicator apparatus as claimed in claim 1 wherein said sensing means includes a photocell and a light source for sensing the state of fullness of a container.

6. An apparatus as claimed in claim 1 wherein said sensing means includes a thermostatic switch for sensing a temperature.

7. A flashing indicator apparatus for use in connection with a ceramic top infrared radiant range including a burner element, said burner element being operable in a first de-energized state and a second energized state, said burner element having an element temperature, comprising in combination:
- a power supply;
- indicator light means visible to an operator;
- second light means having a predetermined firing potential, said second light means being operable in a first state whenever the voltage across said second light means exceeds said firing potential;
- means for intermittently firing said second light means;
- means for interconnecting said indicator light means and said power supply whenever said burner element is in said second energized state, whereby said indicator light means is operable;
- means for sensing said element temperature and connecting said indicator light means to said power supply whenever said element temperature exceeds a predetermined temperature; and
- transistor means having an operable state for shorting said indicator light means, said transistor means being interconnected with and responsive to said second light means, said transistor means being in said operable state whenever said second light means is in said first state, whereby said indicator light intermittently flashes.

8. A flashing apparatus as claimed in claim 7 wherein said firing means includes a capacitor in parallel combination with said second light means, said sensing means connecting said capacitor to said power supply whenever said element temperature exceeds said predetermined temperature, whereby said capacitor changes and fires said second light means.

9. A flashing indicator apparatus as claimed in claim 7 wherein said second light means is a neon gas bulb.

10. A flashing indicator apparatus as claimed in claim 7 wherein said sensing means includes a thermostatic switch in communication with said burner element, said thermostatic switch closing whenever said element temperature exceeds a predetermined threshold temperature.

11. A flashing indicator apparatus as claimed in claim 10 wherein said predetermined threshold temperature is approximately 120°F.

* * * * *